(12) United States Patent
Mazyar et al.

(10) Patent No.: US 9,283,619 B2
(45) Date of Patent: Mar. 15, 2016

(54) POLARIZABLE NANOPARTICLES COMPRISING COATED METAL NANOPARTICLES AND ELECTRORHEOLOGICAL FLUID COMPRISING SAME

(75) Inventors: Oleg A. Mazyar, Houston, TX (US);
Soma Chakraborty, Houston, TX (US);
Terry R. Bussear, Spring, TX (US);
Michael H. Johnson, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 294 days.

(21) Appl. No.: 13/288,404

(22) Filed: Nov. 3, 2011

(65) Prior Publication Data

US 2013/0115462 A1 May 9, 2013

(51) Int. Cl.
| | |
|---|---|
| *B32B 5/16* | (2006.01) |
| *B22F 1/02* | (2006.01) |
| *C10M 171/00* | (2006.01) |
| *B22F 1/00* | (2006.01) |
| *C22C 26/00* | (2006.01) |
| *B82Y 30/00* | (2011.01) |

(52) U.S. Cl.
CPC .............. *B22F 1/02* (2013.01); *B22F 1/0022* (2013.01); *C10M 171/001* (2013.01); *C22C 26/00* (2013.01); *B82Y 30/00* (2013.01); *C10M 2201/05* (2013.01); *C10M 2203/1006* (2013.01); *C10M 2203/1085* (2013.01); *C10N 2210/01* (2013.01); *C10N 2210/03* (2013.01); *C10N 2210/04* (2013.01); *C10N 2210/06* (2013.01); *C10N 2210/07* (2013.01); *C10N 2210/08* (2013.01); *C10N 2220/082* (2013.01); *C10N 2230/08* (2013.01); *C10N 2230/10* (2013.01); *C10N 2230/60* (2013.01); *C10N 2240/201* (2013.01); *C22C 2026/001* (2013.01); *C22C 2026/002* (2013.01); *Y10T 428/2991* (2015.01)

(58) Field of Classification Search
CPC ................................. B82Y 30/00; B82Y 40/00
USPC ............................ 428/403–407; 977/786, 832
See application file for complete search history.

(56) References Cited

U.S. PATENT DOCUMENTS

| | | | | |
|---|---|---|---|---|
| 5,516,445 | A * | 5/1996 | Sasaki | C10M 171/001 252/62.56 |
| 6,096,235 | A * | 8/2000 | Asako et al. | 252/78.3 |
| 6,280,658 | B1 * | 8/2001 | Atarashi et al. | 252/572 |
| 9,177,691 | B2 * | 11/2015 | Bussear | C08F 20/16 |
| 2004/0105980 | A1 * | 6/2004 | Sudarshan et al. | 428/404 |
| 2004/0162365 | A1 * | 8/2004 | Matsumoto et al. | 523/200 |
| 2006/0040103 | A1 * | 2/2006 | Whiteford et al. | 428/403 |

FOREIGN PATENT DOCUMENTS

| | | |
|---|---|---|
| KR | 100659590 B1 | 12/2006 |
| KR | 1020110065600 A | 6/2011 |
| KR | 1020110105311 A | 9/2011 |
| WO | 2008055371 A2 | 5/2008 |
| WO | WO 2011136654 A1 | 11/2011 |

OTHER PUBLICATIONS

Li et al., Shell-isolated nanoparticle-enhanced Raman spectroscopy, Nature, vol. 464, Mar. 2010 [DOI:10.1038/nature08907].*
Grass et al., Covalently Functionalized Cobalt Nanoparticles as a Platform for magnetic separation in organic synthesis, Angew. Chem. Int. Ed. 2007, 46, 4909-4912.*
Chul-Jin Choi et al., "Preparation and Characterization of Magnetic Fe, Fe/C and Fe/N Nanoparticles Synthesized by Chemical Vapor Condensation Process," Rev. Adv. Mater. Sci., 2003, vol. 5, pp. 487-492.
L S Panchakarla et al., "Carbon nanostructures and graphite-coated metal nanostructures obtained by pyrolysis of ruthenocene and ruthenocene-ferrocene mixtures," Bull. Mater. Sci., vol. 30, No. 1, Feb. 2007, pp. 23-29.
Nick Caiulo et al., "Carbon-Decorated FePt Nanoparticles," Adv. Funct. Mater., 2007, vol. 17, pp. 1392-1396.
Norman A. Luechinger et al., "Surfactant-Free, Melt-Processable Metal-Polymer Hybrid Materials: Use of Graphene as a Dispersing Agent," Adv. Mater. 2008, vol. 20, pp. 3044-3049.
Rahul Sen et al., "Carbon nanotubes by the metallocene route,"Chemical Physics Letters, vol. 267, Issues 3-4, Mar. 1997, pp. 276-280.
Cassagneau, Thierry, et al. "Contiguous Silver Nanoparticle Coatings on Die Lectric Spheres", Advanced Materials, 2002, vol. 14. No. 10 pp. 732-736, See abstract, p. 735, Fig. 1; pp. 732-736.
International Search Report and Written Opinion; Date of Mailing May 15, 2013, International Application No. PCT/US2012/058952, Korean Intellectual Property Office; Written Opinon pp. 1-7, Search Report 8-9.
Jiaxing, Li, et al., Giant Electrorheological Fluid comprising nanoparticles: Carbon nanotube composite, Journal of Applied Physics, 2010, vol. 107, pp. 09357-1-09357-5, see abstract, col. 2 of p. 093507-2, Fig. 2.
Ma et al., "Chemical Functionalization of Magnetic Carbon-Encapsulated Nanoparticles Based on Acid Oxidation," J. Phys. Chem. B 2006, 110. 20118-20122.
Norman A. Luechinger, Norman Booth, Greg Heness, Sri Bandyopadhyay,Robert N. Grass, and Wendelin J. Stark; "Surfactant-Free, Melt-Processable Metal Polymer Hybrid Materials: Use of Graphene as a Dispersing Agent," Adv. Mater. 2008, 20, 3044-3049.
Robert N. Grass, Evagelos K. Athanassiou, and Wendelin J. Stark; "Covalently Functionalized Cobalt Nanoparticles as a Platform for Magnetic Separations in Organic Synthesis," Angew. Chem. Int. Ed. 2007, 46, 4909-4912.

* cited by examiner

*Primary Examiner* — Holly Le
(74) *Attorney, Agent, or Firm* — Cantor Colburn LLP

(57) ABSTRACT

A nanoparticle composition includes a metal nanoparticle, and a continuous dielectric coating on a surface of the metal nanoparticle, the nanoparticle composition being a dielectric material. A nanoparticle is in addition the reaction product of an organometallic compound. An electrorheological fluid comprises the nanoparticle composition and a dielectric fluid, and a method of making an electrorheological fluid is also disclosed.

20 Claims, No Drawings

POLARIZABLE NANOPARTICLES COMPRISING COATED METAL NANOPARTICLES AND ELECTRORHEOLOGICAL FLUID COMPRISING SAME

BACKGROUND

Field-sensitive rheological fluids are compositions that generally include dielectric and/or magnetic particles suspended in a base fluid, and that show a change in viscosity when in the presence of an electric or magnetic field, respectively. Such field-sensitive rheological fluids are referred to in the art as "smart" fluids. In such fluids these particles are polarized in the presence of the applied field. The particles interact by aligning and orienting to form chain-like and/or lattice-like structures within the base fluid, aligned to the field. In turn, the aligned particles cause an increase in the effective viscosity of the bulk fluid. Removal of the field causes the particles to de-orient and to adopt an amorphous configuration, and hence, viscosity in turn decreases.

Typically, such field-sensitive rheological fluids include electrorheological fluids of polarizable materials with a low conductivity and a high dielectric constant, such as low molecular weight phenolic/phenolate oligomers, salts of (meth)acrylate oligomers and polymers, and other such materials, or magnetorheological fluids of ferromagnetic particles suspended in a base fluid such as a silicone or mineral oil. However, there remains a need for field-sensitive rheological fluids with improved properties such as a greater range of effective viscosity for a given electrical field strength and loading of the polarizable or ferromagnetic materials, and a faster response time as well as high temperature performance.

SUMMARY

The above and other deficiencies in the prior art are be overcome by, in an embodiment, a nanoparticle composition comprising a metal nanoparticle, and a continuous dielectric coating on a surface of the metal nanoparticle, the nanoparticle composition being a dielectric material.

In another embodiment, an electrorheological fluid comprises a nanoparticle composition comprising a metal nanoparticle, and a continuous dielectric coating comprising a carbonaceous coating, metal oxide coating, metal nitride coating, metal carbide coating, or combination comprising at least one of the foregoing coatings, disposed on a surface of the metal nanoparticle, the nanoparticle composition being a dielectric material; and an aqueous or non-aqueous base fluid.

In another embodiment, a nanoparticle composition comprises a metal nanoparticle comprising Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, and a continuous carbonaceous coating comprising a carbon onion structure, nanotubes, fullerene structure, graphite, graphene, carbon black, a worm-like graphene structure, or a combination comprising at least one of the foregoing structures coating the metal nanoparticle, the carbonaceous coating being non-conductive and completely covering a surface of the metal nanoparticle, the nanoparticle composition being a dielectric material.

In another embodiment, a nanoparticle composition comprises a reaction product of an organometallic compound comprising a metal including Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, the reaction product comprising a core of the metal, and a continuous dielectric coating on a surface of the core, the continuous dielectric coating comprising a carbonaceous coating, metal oxide coating, metal nitride coating, metal carbide coating, or a combination comprising at least one of the foregoing structures, the nanoparticle composition being a dielectric material.

In another embodiment, a method of making an electrorheological fluid includes forming a nanoparticle composition by the reaction of an organometallic compound comprising Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, the reaction product comprising a core of the organometallic compound metal, and a continuous dielectric coating on a surface of the core, the continuous dielectric coating comprising a carbonaceous coating, a metal oxide coating, a metal nitride coating, a metal carbide coating, or a combination comprising at least one of the foregoing structures, and combining the pyrolysis product with dielectric fluid.

DETAILED DESCRIPTION

Disclosed herein are field-sensitive rheological fluids based on nanoparticulate metals with a carbonaceous coating. As used herein, "field-sensitive" means that the fluid is one which undergoes a rheological change in response to exposure of the field-sensitive rheological fluid to a magnetic and/or electrical field. In this way, a field-sensitive rheological fluid, sometimes referred to in the art as a "smart fluid", includes both magneto- and electrorheological fluids prepared from a nanoparticle composition of a metallic nanoparticle having a continuous dielectric coating, such as a carbonaceous coating, metal oxide coating, metal nitride coating, or metal carbide coating and dispersed in a fluid. "Continuous dielectric coating," as used herein, means a coating formed of interconnected structural motifs which provide an effective dielectric barrier between nanoparticle complexes and prevent conductivity between the metal nanoparticles. Such materials provide a high degree of polarizability, and hence solution structuring necessary to form linear or network arrangements upon exposing the electrorheological fluid to an electrical field. The nanoparticle composition, because of its high thermal stability and high polarizability, also imparts improved high temperature performance to the electrorheological fluids.

In an embodiment, the field-sensitive rheological fluid is an electrorheological fluid comprising a nanoparticle composition comprising a metal nanoparticle, and a continuous dielectric coating on a surface of the metal nanoparticle.

Nanoparticles are particles with an average particle size (largest average dimension) of about 1 nanometer (nm) to less than about 1 micrometer (µm). In some embodiments, the nanoparticles have an average particle size of less than about 1 micrometer (µm), and more specifically a largest average dimension less than or equal to about 500 nanometer (nm), and still more specifically less than or equal to about 250 nm, where particle sizes of greater than about 250 nm to less than about 1 µm are also be referred to in the art as "sub-micron sized particles." As used herein, "average particle size" refers to particle size measurements based on number average particle size measurements, which can be routinely obtained by laser light scattering methods such as static or dynamic light scattering (SLS or DLS, respectively). Also in an embodiment, the nanoparticles have an aspect ratio of greater than about 1, in an embodiment, greater than about 10, and in another embodiment, greater than about 50.

The metal includes any metal suitable for use in a field-sensitive rheological application. In an embodiment, the metal nanoparticle comprises any metal useful for forming a conductor. Useful conducting metal materials include in particular those of the group 9, 10, and 11 metals, as well as the main group metals and the lanthanides. Exemplary metals for this purpose include Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing. In an embodiment, the metal nanoparticle is a highly conducting metal material. As used herein, highly conducting means having an electrical conductivity of greater than $10^6$ Siemens per meter (S/m) at ambient temperatures (i.e., 20° C.). Exemplary such metals include Ag, Al, Au, Cu, Fe, Co, Ni, Pt, Pd, alloys thereof, and combinations comprising at least one of the foregoing.

Combinations of nanoparticles may also be used as the nanoparticles. Included in the combination are nanoparticles such as graphene, having an aspect ratio of greater than about 1, and in an embodiment, greater than about 10; graphene fiber; nanotubes, including carbon nanotubes, metallic nanotubes, and inorganic nanotubes such as boron nitride nanotubes, where the nanotubes are single-walled nanotubes (SWNT), multiwalled nanotubes (MWNT), or combinations of these; fullerenes, such as any of the known cage-like hollow allotropic forms of carbon possessing a polyhedral structure and which include, for example, from about 20 to about 100 carbon atoms, and included as closo- or nido-structures, where exemplary fullerenes include, for example, $C_{60}$ which is a fullerene having 60 carbon atoms and high symmetry ($D_{5h}$), $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like; graphite, including nanographite, which is a nano-scale cluster of plate-like sheets composed of fused 6-membered delocalized pi-electron carbon rings, in which a stacked structure of one or more layers having a plate-like two dimensional structure of carbon in the form of fused hexagonal rings with an extended delocalized π-electron system, which are layered and weakly bonded to one another through π-π stacking interaction, and where nanographite has a layered structure of greater than or equal to about 50 single sheet layers, specifically greater than or equal to about 100 single sheet layers, and more specifically greater than or equal to about 500 single sheet layers; carbon black including conductive and non-conductive carbon blacks; nanoclays including hydrated or anhydrous silicate minerals with a layered structure and such as alumino-silicate clays such as kaolins including halloysite, smectites including montmorillonite, illite, and the like and which are exfoliated to separate individual sheets, or are non-exfoliated; inorganic nanoparticles including a metal or metalloid carbide such as tungsten carbide, silicon carbide, boron carbide, a metal or metalloid nitride such as titanium nitride, boron nitride, silicon nitride, a metal or metalloid oxide such as titanium oxide, alumina, silica, tungsten oxide, and iron oxides; or a combination comprising at least one of the foregoing.

The nanoparticle is derivatized or underivatized. When derivatized, the nanoparticles are derivatized to introduce chemical functionality to the nanoparticle. In an embodiment, the nanoparticle is derivatized to include functionality for adjusting surface properties and blendability of the nanoparticles with a matrix (e.g., dielectric fluids for the electrorheological fluid solution, etc.). For example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups.

Thus, in an embodiment, the nanoparticle composition further comprises an additional nanoparticle, the additional nanoparticle being derivatized or underivatized and comprising graphene, graphene fiber, nanotube, fullerene, graphite, carbon black, nanoclay, inorganic nanoparticle, or a combination comprising at least one of the foregoing.

The coating for the metal nanoparticles is a continuous dielectric coating having polarizing properties but low conductivity (e.g., less than about $10^{-7}$ Siemens per centimeter). The continuous dielectric coating is carbonaceous, metal oxide, metal nitride, metal carbide, or a combination comprising at least one of the foregoing coatings. Where the coating is a carbonaceous coating, the coating includes carbon structural motifs based on amorphous, tetrahedral, or delocalized 5-, 6-, and/or 7-membered carbon rings. In an embodiment, the carbonaceous coating includes regular and amorphous carbon, and includes at least 6-membered fused carbon rings having an extended pi-electron system. As used herein with respect to carbon, "regular" means having a regular, periodic structural lattice and/or ring arrangement of the carbon atoms. It will be understood that because extended pi-electron systems are electrically conducting, the carbonaceous coating includes defects which break the extended pi-electron system sufficient to render the carbonaceous coating non-conducting.

It will also be understood that the carbonaceous coating is not a discrete particle but is a contiguous coating having one or more, and in an embodiment, two or more, carbon structural motifs depending on the method and conditions used in forming the coating. Exemplary carbonaceous coatings include contiguous structures comprising a carbon onion structure, which includes graphitic 6-membered carbon rings arranged in layers; nanotubes, including carbon nanotubes, metallic nanotubes, and inorganic nanotubes such as boron nitride nanotubes, where the nanotubes are single-walled nanotubes (SWNT), multiwalled nanotubes (MWNT), or combinations of these as described above; fullerene structures; graphite, including nanographite; graphene, carbon black, a worm-like graphene structure, or a combination comprising at least one of the foregoing structures. It will be further understood that the coating includes one or more, and in an embodiment, two or more, of these structural motifs as an integral part of the contiguous carbonaceous coating, as tethered units, or a combination comprising at least one of the foregoing. In an embodiment, the coating is less than or equal to about 20 nm, in another embodiment, less than or equal to 10 nm, and in another embodiment, less than or equal to 5 nm thickness.

Metal nanoparticles coated with carbonaceous, metal oxide, metal nitride, or metal carbide coatings can be made by any of various methods known in the art. In an embodiment, the metal nanoparticle is formed by the reaction of an organometallic compound. For example, catalytic chemical vapor deposition can be used to form layers of a metal oxide on a surface of a catalytic metal, such as iron. Such materials can be prepared by a suitable method (e.g., "Preparation and Characterization of Magnetic Fe, Fe/C and Fe/N Nanoparticles Synthesized by Chemical Vapor Condensation Process," Chul-Jin Choi, Byoung-Kee Kim, Oleg Tolochko, and Li-Da., *Rev. Adv. Mater. Sci.*, 2003, Vol. 5, pp. 487-492). In an embodiment, the nanoparticle composition comprises the pyrolysis product of a metallocene. For example, the metal nanoparticles are formed by pyrolysis of metallocenes (ferrocene, cobaltocene, nickelocene, and ruthenocene) and their mixtures in the ethylene/hydrogen atmosphere. Pyrolysis of metallocenes produces nanoparticles and nanorods of alloys encapsulated in, for example, carbon onion-like structures, nanotubes and worm-like structures. Such materials can be prepared by methods found in the art (e.g., "Carbon nanostructures and graphite-coated metal nanostructures obtained by pyrolysis of ruthenocene and ruthenocene-ferrocene mixtures," L. S. Panchakarla, A. Govindaraj, *Bull. Mater. Sci.*, Vol. 30, No. 1, pp. 23-29, February 2007; "Carbon nanotubes by the metallocene route," Rahul Sen, A. Govindaraj and C. N. R. Rao, *Chemical Physics Letters*, Vol. 267, Issues 3-4, pp. 276-280, March 1997). In another exemplary method, noble metal particles having a carbonaceous coating can be formed ("Carbon-Decorated FePt Nanoparticles," Nick Caiulo, Chih Hao Yu, Kai Man K. Yu, Chester C. H. Lo, William Oduro, Benedicte Thiebaut, Peter Bishop, and Shik Chi Tsang, *Adv. Funct. Mater.*, 2007, Vol. 17, p. 1392-1396). Another example includes cobalt nanoparticles with 1-2 nm of graphene as a coating and a cobalt core of 10-50 nm in diameter as found in "Surfactant-Free, Melt-Processable Metal-Polymer Hybrid Materials: Use of Graphene as a Dispersing Agent", Norman A. Luechinger, Norman Booth, Greg Heness, Sri Bandyopadhyay, Robert N. Grass, and Wendelin J. Stark, *Adv. Mater.* 2008, Vol. 20, pp. 3044-3049. All references cited are incorporated herein by reference.

Carbonaceous metal-containing structures formed pyrolytically from metallocene precursors are useful in the preparation of field-sensitive rheological fluids including electrorheological fluids. Particles containing conductive metals exhibit polarizability and high dielectric constant, and are insulated from one another by the presence of the carbonaceous coating to desirably produce dielectric materials suitable for such applications.

The nanoparticle composition of the electrorheological fluid is polarizable, and is electrically insulating. In an embodiment, the carbonaceous coating forms shell covering all or part of the metal nanoparticle. In an embodiment, the nanoparticle composition is polarizable upon exposure to an electrical field. Thus, in an embodiment, the nanoparticle composition is a dielectric material. It will be appreciated that for the nanoparticle composition to be a dielectric material, and polarizable but not electrically conducting, the carbonaceous coating forms a shell covering the entire metal nanoparticle, electrically insulating it from any adjacent particle of the nanoparticle composition. In this way, the metal nanoparticle is electrically insulated, and hence polarizability and alignment to an electrical field occurs without formation of a conductive pathway which can lead to a short circuit in the electrorheological fluid. The carbonaceous coating itself is polarizable in an electrical or magnetic field, as well as functionalizable. Derivatization of the continuous dielectric coating with functional groups having a dipole moment such as —OH, —COOH, and the like, can further increase the polarizability of the nanoparticle composition by aligning the dipoles.

In an embodiment, the nanoparticle composition is underivatized, or in another embodiment, is derivatized to include a functional group including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

In an embodiment, the coated nanoparticles are attached to or coated on a support material with low conductivity and high dielectric constant. The nanoparticle composition is thus any combination of metal nanoparticle and carbonaceous coating having suitable dielectric properties. In some embodiments, the nanoparticles are coated on a support which is inorganic or organic, and where organic, is a conducting or non-conducting polymer. Thus in an embodiment, the support particle is a polymeric or inorganic support particle attached to or coated with the nanoparticle composition.

In an embodiment, the nanoparticle composition includes a support. Where a support is used, the nanoparticle is covalently bonded to or coated on a surface of the polymeric or inorganic support particle. Where the attachment is covalent, the nanoparticle is functionalized as above, and the support particle is functionalized to have a complementary functional group, where the artisan skilled in the art will appreciate which pairings of functional groups are complementary with those listed for the nanoparticles where functionalized. For example, where the nanoparticle has hydroxy groups, the support particle has a group such as a carboxylate, to form an ester. Similarly, where the nanoparticle has a carboxylate group on it, the support particle has a hydroxy, amine, or epoxy group. Combinations of compatible functional groups are useful. Thus, in an embodiment, where a derivatized nanoparticle is used, the substrate particle is derivatized on its surface to include, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups, provided these groups are complementary and as such form a bond with a corresponding group on the derivatized nanoparticle.

The support material is a polymeric or inorganic particle. In some embodiments, the support material is a micro scale (i.e., 1 µm or greater) material. Combinations of particles, including those having different particle sizes, can also be used.

In an embodiment, the polymeric particle includes a styrenic polymer or copolymer, a (meth)acrylate polymer or copolymer, or a highly conjugated aromatic polymer. It will be appreciated that where a highly conjugated aromatic polymer is used, the polymer is desirably in a non-conducting (i.e., non-doped) form, so that the polymer is polarizable but not conductive. Also, (meth)acrylate, as used herein, indicates both acrylate and methacrylate interchangeably.

Exemplary non-conjugated polymeric particles include those formed of polystyrene, poly(styrene-co-(meth)acrylates), and poly(meth)acrylates (including metal salts of (meth)acrylic acids). Exemplary conjugated polymeric particles include those formed of polyaniline, polythiophene, polyphenylenevinylene, polypyrrole. Combinations comprising at least one of the foregoing polymers can also be used. Such highly conjugated aromatic polymers can be more readily polarized and as such have a higher dielectric constant than, for example, a poly(meth)acrylate polymer.

Similarly, inorganic particles include those having high polarizability and generally high dielectric constant (i.e., greater than or equal to about 4, when measured at 1 KHz). Useful inorganic particles include ceramics, metal oxides, metals, or a combination comprising at least one of the foregoing.

Exemplary ceramic support particles include barium titanyl oxalate, barium titanate, boron nitride, titanium nitride, silicon nitride, tantalum nitride, or a combination comprising at least one of the foregoing.

Exemplary metal oxide support particles include barium titanate, iron oxide, nickel oxide, cobalt oxide, tungsten oxides, titanium dioxide, zirconium dioxide, hafnium dioxide, zinc oxide, cupric oxide, cuprous oxide, alumina, silica, or a combination comprising at least one of the foregoing.

Exemplary metal support particles include iron, nickel, cobalt, manganese, zinc, copper, titanium, gold, platinum, tin, aluminum, tantalum, molybdenum, rhodium, or a combination comprising at least one of the foregoing. Where metals are used in electrorheological applications, it will be understood that the metal is electrically shielded by coating with a dielectric material.

In an embodiment, the nanoparticle composition includes nanoparticles in an amount of about 0.1 to about 90 wt %, in an embodiment, 1 to about 80 wt %, in another embodiment about 5 to about 70 wt %, and in still another embodiment about 10 to about 50 wt %, based on the total weight of nanoparticle composition.

The electrorheological fluid further includes as a component a base fluid generally having a lower dielectric constant than the nanoparticle composition. In an embodiment, the fluid is a dielectric fluid. In an embodiment, the dielectric constant of the dielectric fluid is lower than that of the nanoparticle composition. In an embodiment, the difference in dielectric constant between the nanoparticle composition and the dielectric fluid is greater than or equal to about 0.1, in an embodiment, greater than or equal to about 0.5, and in another embodiment, greater than or equal to about 1.0, measured at 1 KHz. The base fluids include organic and/or inorganic fluids, and are aqueous or non-aqueous. In an embodiment, the base fluid is non-electrolytic and has a low dielectric constant as defined above.

Thus, in an embodiment, the dielectric fluid is non-aqueous and non-conductive, and is an organic fluid. In an exemplary embodiment, the dielectric fluid is an oil, such as a mineral oil or petroleum distillate residue having a relatively low volatility (e.g., as obtained for hydrocarbons with an average chain length of $C_8$ or greater). In another embodiment, the dielectric fluid is inorganic/organic hybrid fluid, such as a silicone oil including low molecular weight polydimethylsiloxanes. It will be appreciated that where the fluid has a relatively high dielectric constant, the nanoparticle composition components are selected such that the dielectric constant of the nanoparticle composition remains greater than that of the base fluid.

In an embodiment, the nanoparticle composition is included in the electrorheological fluid in an amount of about 0.1 to about 60 wt %, in an embodiment, 1 to about 50 wt %, and in another embodiment about 5 to about 45 wt %, based on the total weight of nanoparticle composition and base fluid.

The viscosity of such a fluid is about 1 centistoke or greater, but is not limited thereto. In an embodiment, the dielectric constant of the dielectric fluid is less than about 4, as measured at 1 KHz. In some embodiments, the electrorheological fluid exhibits an expansion of volume of greater than or equal to about 10%, in an embodiment, greater than or equal to about 25%, and in another embodiment, greater than or equal to about 50%.

In an embodiment, a nanoparticle composition comprises a metal nanoparticle comprising Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, and a continuous carbonaceous coating comprising a carbon onion structure, nanotubes, fullerene structure, graphite, graphene, carbon black, a worm-like graphene structure, or a combination comprising at least one of the foregoing structures coating the metal nanoparticle, the carbonaceous coating being non-conductive and completely covering a surface of the metal nanoparticle. In a further embodiment, the nanoparticle composition is a dielectric material. In a further embodiment, the carbonaceous coating is derivatized so that it is not electrically conducting or semiconducting. In another embodiment, an electrorheological fluid comprises the nanoparticle composition.

In an embodiment, a nanoparticle composition comprises a the reaction product of an organometallic compound comprising a metal including Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, the reaction product comprising a core of the organometallic compound metal, and a continuous dielectric coating on a surface of the core, the continuous dielectric coating comprising a carbonaceous coating, metal oxide coating, metal nitride coating, metal carbide coating, or a combination comprising at least one of the foregoing coatings, the nanoparticle composition being a dielectric material. In another embodiment, an electrorheological fluid comprises the nanoparticle composition.

In another embodiment, a method of making an electrorheological fluid includes forming a nanoparticle composition by the reaction of an organometallic compound comprising Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing, the reaction product comprising a core of the organometallic compound metal, and a continuous dielectric coating on a surface of the core, the continuous dielectric coating comprising a carbonaceous coating, a metal oxide coating, a metal nitride coating, a metal carbide coating, or a combination comprising at least one of the foregoing structures, and combining the pyrolysis product with dielectric fluid.

The nanoparticle composition reversibly forms chain or lattice structures in the dielectric fluid upon exposure to an electrical field. Such compositions are useful in a variety of downhole applications to generate a hydraulic pressure, which can in turn be used to actuate valves, switches, pistons, and to operate downhole tools such as expandable plugs.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A nanoparticle composition comprising:
a metal nanoparticle, and
a continuous dielectric coating on a surface of the metal nanoparticle, wherein the dielectric coating is a carbonaceous coating, metal nitride coating, metal carbide coating, or a combination comprising at least one of the foregoing coatings,
the nanoparticle composition being a dielectric material,
wherein the nanoparticle composition further comprises an additional nanoparticle, the additional nanoparticle comprising derivatized graphene, derivatized graphene fiber, derivatized nanotube, derivatized fullerene, derivatized graphite, derivatized carbon black, derivatized or underivatized nanoclay, a derivatized or underivatized inorganic nanoparticle, or a combination comprising at least one of the foregoing, wherein the inorganic nanoparticle is selected from a metal or metalloid carbide, a metal or metalloid nitride, and a metal or metalloid oxide.

2. The nanoparticle composition of claim 1, wherein the metal nanoparticle comprises Ag, Al, Au, Co, Cu, Fe, Hf, In, Ir, Nd, Ni, Pd, Pt, Rh, Ru, Sm, Sn, Ti, V, Y, Zr, alloys thereof, or a combination comprising at least one of the foregoing.

3. The nanoparticle composition of claim 1, wherein the continuous dielectric coating is a carbonaceous coating comprising a carbon onion structure, nanotubes, fullerene structure, graphite, graphene, carbon black, a worm-like graphene structure, or a combination comprising at least one of the foregoing structures.

4. The nanoparticle composition of claim 1, wherein the carbonaceous coating forms a polarizable shell covering all or part of the metal nanoparticle.

5. The nanoparticle composition of claim 1, wherein the nanoparticle composition comprises the pyrolysis product of a metallocene.

6. The nanoparticle composition of claim 1, wherein the metal nanoparticle has an aspect ratio of greater than or equal to about 1:1.

7. The nanoparticle composition of claim 1, wherein the metal nanoparticle has an aspect ratio of greater than or equal to about 10:1.

8. The nanoparticle composition of claim 1, wherein the metal nanoparticle has a number averaged particle size of less than about 1 micrometer.

9. The nanoparticle composition of claim 1, wherein the additional nanoparticle is derivatized to include a functional group including carboxy, epoxy, ether, ketone, amine, hydroxy, alkoxy, alkyl, aryl, aralkyl, alkaryl, lactone, functionalized polymeric or oligomeric groups, or a combination comprising at least one of the foregoing functional groups.

10. The nanoparticle composition of claim 1, further comprising a polymeric or inorganic support particle attached to or coated with the nanoparticle composition.

11. The nanoparticle composition of claim 10, wherein the polymeric support particle comprises a styrenic polymer or copolymer, a (meth)acrylate polymer or copolymer, or a highly conjugated aromatic polymer.

12. The nanoparticle composition of claim 10, wherein the polymeric support particle is a polystyrene, poly(styrene-co-(meth)acrylate), poly(meth)acrylate, polyaniline, polythiophene, polyphenylenevinylene, polypyrrole, or a combination comprising at least one of the foregoing.

13. The nanoparticle composition of claim 10, wherein the inorganic support particle comprises a ceramic, a metal oxide, a metal, or a composite comprising at least one of the foregoing.

14. The nanoparticle composition of claim 1, wherein the carbonaceous coating comprises carbon structural motifs based on amorphous, tetrahedral, or delocalized 5-, 6-, and/or 7-membered carbon rings.

15. The nanoparticle composition of claim 14, wherein the carbonaceous coating comprises at least 6-membered fused carbon rings having an extended pi-electron system, and wherein the carbonaceous coating comprises defects which break the extended pi-electron system sufficient to render the carbonaceous coating non-conducting.

16. An electrorheological fluid comprising the nanoparticle composition of claim 1 and a dielectric base fluid.

17. The electrorheological fluid of claim 16, wherein the base fluid is non-aqueous and wherein the non-aqueous base fluid comprises an oil, a petroleum distillate, a polymeric fluid, or a combination comprising at least one of the foregoing.

18. The electrorheological fluid of claim 16, wherein the base fluid is non-aqueous and wherein the non-aqueous base fluid is a $C_8$ or greater mineral oil, a silicone oil, kerosene, or a combination comprising at least one of the foregoing.

19. An electrorheological fluid, comprising:
a nanoparticle composition comprising
a metal nanoparticle,
a continuous dielectric coating comprising a carbonaceous coating, metal oxide coating, metal nitride coating, metal carbide coating, or combination comprising at least one of the foregoing coatings, disposed on a surface of the metal nanoparticle, and
wherein the nanoparticle composition further comprises an additional nanoparticle, the additional nanoparticle comprising derivatized graphene, derivatized graphene fiber, derivatized nanotube, derivatized fullerene, derivatized graphite, derivatized carbon black, derivatized or underivatized nanoclay, a derivatized or underivatized inorganic nanoparticle, or a combination comprising at least one of the foregoing, wherein the inorganic nanoparticle is selected from a metal or metalloid carbide, a metal or metalloid nitride, and a metal or metalloid oxide,
the nanoparticle composition being a dielectric material; and
an aqueous or non-aqueous base fluid.

20. The electrorheological fluid of claim 19, wherein the difference in dielectric constant between the nanoparticle composition and the dielectric fluid is greater than or equal to about 0.1 measured at 1 KHz.

* * * * *